United States Patent [19]

Gueret

[11] Patent Number: 5,229,439
[45] Date of Patent: Jul. 20, 1993

[54] MANUFACTURING PROCESS FOR COMPONENT HAVING THE APPEARANCE OF NATURAL STONE BY MOULDING A COMPOSITION CONTAINING A HEAT-SETTING RESIN AND COMPONENT OBTAINED BY MEANS OF THE PROCESS

[75] Inventor: Jean-Louis H. Gueret, Paris, France

[73] Assignee: L'Oreal, Paris, France

[21] Appl. No.: 880,583

[22] Filed: May 8, 1992

[30] Foreign Application Priority Data

May 27, 1991 [FR] France ................... 91 06329

[51] Int. Cl.$^5$ .............................................. C08L 97/00
[52] U.S. Cl. ........................................ 524/13; 524/34; 524/36; 524/39; 524/425; 524/430; 524/441; 524/449; 264/73; 264/77; 264/126; 264/331.16
[58] Field of Search .......... 524/13, 34, 36, 39, 524/425, 430, 441, 449; 264/73, 77, 126, 331.16

[56] References Cited

U.S. PATENT DOCUMENTS

| 4,086,318 | 4/1978 | Garasi et al. | 264/73 |
| 4,137,215 | 1/1979 | Van Gasse | 260/40 R |
| 4,414,340 | 11/1983 | Senatore et al. | 524/425 |
| 4,643,921 | 2/1987 | Terabe et al. | 524/449 |
| 5,002,583 | 3/1991 | Lord et al. | 524/425 |

FOREIGN PATENT DOCUMENTS 932954 8/1955 Fed. Rep. of Germany .
1156205 6/1969 United Kingdom .

OTHER PUBLICATIONS

English translation of claims of German Patentschrift DE 932 954.

Primary Examiner—Paul R. Michl
Assistant Examiner—LaVonda DeWitt
Attorney, Agent, or Firm—Cushman, Darby & Cushman

[57] ABSTRACT

According to the invention a moulding is produced by compression and extrusion at a temperature between 120° and 160° of a mixture of heat-setting resin and at the most 30% related to the total weight of mixture of a filler with a grain size between 50 micrometers and 4 mm. The filler is a mineral filler and/or natural fibres.

10 Claims, No Drawings

MANUFACTURING PROCESS FOR COMPONENT HAVING THE APPEARANCE OF NATURAL STONE BY MOULDING A COMPOSITION CONTAINING A HEAT-SETTING RESIN AND COMPONENT OBTAINED BY MEANS OF THE PROCESS

The invention concerns a manufacturing process for a component having the appearance of natural stone by moulding a composition containing a heat-setting resin and a component obtained by means of the process.

DESCRIPTION OF THE PRIOR ART

The production of components having the appearance of stone is already known, using mixtures of heat-setting resin and fillers: BE-A 898 289 describes the manufacture of components moulded in "resin concrete" containing less than 12% by weight of heat-setting resin as a binder. However it is difficult when moulding resin concrete however it is difficult to ensure components free from micro-bubbles, and micro-bubbles tend to spoil the appearance. Spherical fillers only can be used to avoid the disadvantage but this limits the range of admissible fillers; in particular it is no longer possible to use natural fillers. The components thus obtained are also relatively fragile and it is difficult to produce thin components.

SUMMARY OF THE INVENTION

The invention concerns a process allowing the production of components with a natural stone appearance by moulding compositions containing a heat-setting resin, free from the above disadvantages. The process also has the advantage that it allows components of a uniform appearance to be obtained free from any marbling effect or drag lines.

DETAILED DESCRIPTION OF THE INVENTION

The object of this invention is a process for the production of a component having the appearance of natural stone, by moulding a composition containing at least a heat-setting resin and at least a filler, characterised by the fact that a mixture is prepared at least comprising particles of heat-setting resin on the one hand, and related to the total composition weight, at most 30% by weight of particle filler chosen from natural fibres, mineral fillers and their mixtures, of maximum particle size (grain size) measuring between 30 micrometers and 4 mm; the mixture is placed in a female mould heated to a temperature between 120° and 160° C.; the mixture is progressively compressed in the mould by means of a hot male core ensuring closure of the female mould, at a pressure sufficient to draw the composition into all of the space between the male core and female mould; the resin thus used is allowed to set while maintaining the temperature, at a pressure sufficient to ensure closure of the mould; and after the mould is opened the component thus obtained is removed.

The male core temperature is preferably between 120° and 160° C. and close to that of the female mould; the normal setting time is between 30 seconds and 3 minutes; the male core is inserted into the female mould until mould closure occurs under pressure, rising to a maximum between $10^8$ and $5 \times 10^9$ pascals over a period of 3 to 60 seconds.

According to the present invention, the heat-setting resin used is a phenolic resin, for instance as sold commercially under the name of "BAKELITE", or an aminoresin, particularly melamine or urea-formaldehyde resin. Various catalysts or accelerators may be added in a known manner with the heat-setting resin thus used. The resin can be advantageously used in the form of granules or pellets of a grain size between 0,05 and 3 mm. The incorporated heat-setting resin may be coloured or otherwise; it can be added in the form of articles of white, colourless or pigmented appearance (ochre, blue, grey or beige for instance).

According to the invention a single heat-setting resin is used preferably; different colour resins used simultaneously do not mix and when drawn tend to form separate stains of an appearance difficult to control and reproduce, failing to reproduce the natural stone effect.

Natural fires used according to the invention, are selected particularly from the group consisting of cellulose or wood cellulose, such as wood fibres (wood dust or saw-dust), fibres drawn from cotton, linen, maize, liana and banana, or cork dust; the fibres used here are selected among those withstanding the moulding temperature. The fibres used according to the invention, preferably have a diameter between 0.7 and 300 micrometers and a length between 30 micrometers and 4 mm. When using a filler comprising fibres of different sizes, the length of the smallest fibres will preferably be between 30 micrometers and 2 mm and of the largest fibres between 2 and 4 mm Mineral fillers used here are drawn namely from the group consisting of calcium carbonate, calcium sulphate, zinc oxide, zinc carbonate, magnesium oxide, magnesium hydroxide, magnesium silicate, such as talc or silico-aluminates, mica and glass in the form of pellets or micro-pellets. Fillers with a grain size between 30 micrometers and 0.2 mm approx.are preferably used.

Natural fibres or mineral fillers may be coloured or otherwise. The colouring of fillers can be achieved by impregnation with a solution of soluble, particularly water soluble colour. Filler colouring is also achieved by centrifuging or spinning with powder colours or acrylic or vinylic paints of the required colour.

According to the invention, at least two filler ingredients of different rain size are preferably used; the ingredients may consist exclusively of natural fibres or exclusively of mineral fillers; more frequently a mixture of ingredients at least containing a natural fibre and at least a mineral filler is used.

Three components of different dimensions or grain size may be advantageously used. The smaller grain size ingredient is preferably a mineral filler whereas the other two ingredients are natural fibres. In the latter case, when talc coloured or not serves as mineral filler, and wood dust coloured or not, as the natural fibres of dimensions between 200 and 300 micrometers, and wood dust coloured or not of the largest size, a moulded component with a single background colour is obtained, dotted with wood dust, the "feature" of the component being achieved with saw-dust.

In the process according to the invention, the moulded composition mixing phase may be carried out in any given type of mixer, for instance a "barrel"-type mixer or preferably, in a worm extruder. The mixture is then stored in a hopper, storage time not being limited at ambient temperature since the setting reaction of the heat-setting resin cannot occur at that temperature.

For the purposes of moulding, metered amounts of moulding compound are placed in the preheated female mould at a temperature between 120° and 160° C. The female mould is closed with the male core, also heated to a temperature of 120° to 160° C. Under the effect of the male core, the mixture is subjected to increasing compression, finally establishing itself at $8.10^8$ Pascals.

Pressure in the mould is preferably applied slowly, the maximum pressure being achieve in a time of 3 to 60 seconds from start of compression. The temperature and pressure conditions defined above are maintained for 30 seconds to 3 minutes according to component thickness and the nature of the moulding compound in use.

The component is then knocked out and trimmed.

It has been found that under the conditions defined above, the filler particles are uniformly distributed in the mould without forming drag-lines, and free from interaction between the heat-setting resin colour and the colour of pigmented fillers. A component of overall uniform surface appearance is thus obtained.

Depending on the bright or mat colour level required for the component, different moulds may be used. As an example ground finish moulds can be used to achieve a component of slightly mat appearance, emphasizing the stone-like aspect. For a bright surface component, the inner walls of the mould are treated with a "gelcoat" before the mixture is placed in the mould.

The purpose of the invention is also a moulded component with a natural stone appearance, obtained by way of the process as defined above. The components are intended more particularly to produce packaging or packaging accessories for cosmetic products such as bottles, closures, caps, boxes and the like.

For better understanding of the purpose of the present invention, a description is now given purely for illustration and non-restrictive purposes, featuring a number of methods of application.

EXAMPLE 1

Using a worm extruder or shell, a mixture of the following composition is prepared:

| | |
|---|---|
| white urea formaldehyde resin pellets of grain size 0,1 to 1,0 mm | 1000 parts |
| natural beige wood saw-dust of grain size 60 μm | 4 parts |
| pink wood saw-dust of grain size 300 μm | 1.7 parts |
| brown wood saw-dust of grain size 300 μm | 1.7 parts |
| blue wood saw-dust of grain size 1 mm | 0.5 parts |

The saw-dust particles are coloured by impregnation with a water soluble pigment.

The mixture is discharged from the extruder into a hopper. 70 g of the mixture are then placed in a female mould of the following specifications:
ground internal surface
50×50×22 mm print
preheated to a temperature of 140° C.

A male core also heated to 140° C. is placed on the mixture; the core compresses the mixture in the mould, the pressure reaching $8.10^8$ Pascals in one minute. The mould is then closed; the pressure and temperature are maintained for approx. two minutes to await complete setting of the resin. The mould is then opened and the component is trimmed with fettling knife.

A component with a white background is thus obtained having uniformly distributed pink, blue, beige and brown particles.

EXAMPLE 2

As in example 1, a component is produced from a mixture of the following composition:

| | |
|---|---|
| natural beige urea formaldehyde resin pellets of grain size 0,6 mm | 1000 parts |
| natural beige wood saw-dust of grain size 60 μm | 20 parts |
| pink wood saw-dust of grain size 300 μm | 1.5 parts |
| natural beige wood saw-dust of grain size 200 μm | 1.5 parts |
| blue wood saw-dust of grain size 300 μm | 0.5 parts |
| red wood saw-dust of grain size 60 μm | 1 part |
| brown wood saw-dust of grain size 300 μm | 1 part |
| natural white urea formaldehyde resin powder of grain size 0,6 mm | 13 parts |

A component is obtained with a beige background forming a subtle blend of different colours and grain sizes giving depth and density to the component; this component is spotted with white, red, blue, pink, purple, brown and beige spots. The mineral fillers or natural fibres are indelibly pigmented in the component following contact with all type of solvent.

EXAMPLE 3

As in example 1, a component is produced from a mixture of the following composition:

| | |
|---|---|
| natural beige urea formaldehyde resin pellets of grain size 0,6 mm | 1000 parts |
| natural beige wood saw-dust of grain size 60 μm | 20 parts |
| pink (painted) mica particles of grain size 200 μm | 1.5 parts |
| blue (painted) mica particles of grain size 500 μm | 0.5 parts |
| red wood saw-dust of grain size 200 μm | 1 part |
| brown (painted) mica particles of grain size 300 μm | 1 part |
| white mica particles in powder form of grain size 60 μm | 1 part |

A component is obtained with a beige background forming a subtle blend of different colours and grain sizes giving depth and density to the component; this component is doted with white, red, blue, pink, purple, brown and beige dots. The mineral fillers or natural fibres are indelibly pigmented in the component after contact with all types of solvent.

EXAMPLE 4

As in example 1, a component is produced from a mixture of the following composition:

| | |
|---|---|
| beige colour urea formaldehyde resin of grain size 0.6 mm | 1000 parts |
| beige mica particles lighter than the urea formaldehyde resin of grain size 60 μm | 20 parts |
| white mica particles of grain size 1 mm | 13 parts |
| blue (painted) mica particles of grain size 500 μm | 0.5 parts |
| red wood saw-dust of grain size 200 μm | 1 part |
| brown (painted) mica particles of grain size 300 μm | 1 part |
| white mica powder form particles of grain | 1 part |

-continued

| size 60 μm |

A beige shade component with a number of white dots is obtained of an appearance close to that of stone.

I claim:

1. Process for the production of a component having a natural stone appearance, by moulding a composition containing at least a heat-setting resin and at least a filler, characterised in that a mixture is prepared at least comprising particles of a heat-setting resin, and, in relation to the total composition weight, at most 30% by weight of particle filler chosen from natural fibres, mineral fillers and their mixtures, of maximum particle size measuring between 30 micrometers and 4 mm wherein the mixture is placed in a female mould heated to a temperature between 120° and 160° C.; the mixture in the mould is progressively compressed in the mould by means of a hot male core ensuring closure of the female mould, at a pressure sufficient to draw the composition into the whole of the space between the male core and female mould; allowing the resin thus used to set while maintaining the temperature, and under pressure sufficient to ensure closure of the mould with the pressure rising to a maximum in the range of $10^8$ to $5 \times 10^9$ pascals; and after the mould is opened the component thus obtained is removed.

2. Process according to claim 1, characterised by the use of a phenolic or aminoresin as heat-setting resin.

3. Process according to one of claims 1 or 2, characterised by the use of natural fibres, cellulose or wood cellulose fibres.

4. Process according to claim 1, characterised by the use of a mineral filler consisting of calcium carbonate, calcium sulphate, zinc oxide, zinc carbonate, magnesium oxide, magnesium hydroxide, magnesium silicate and silico-aluminates.

5. Process according to claim 4, characterised by the use of mineral fillers, of a grain size between 30 micrometers and 0.2 mm.

6. Process according to claim 1, characterised in that at least one particle filler ingredient is coloured by impregnation by means of a soluble colour or by paint coating of selected colour.

7. Process according to of claim 1, characterised in that at least two fillers, preferably at least three fillers of differing grain size or dimensions are used.

8. Process according to claim 1, characterised by the use of a mould with a lightly ground finish.

9. Process according to claim 1, characterised in that a coating is applied to the mould inner walls before introducing the moulding compound.

10. Component having the appearance of natural stone obtained by a process according to claim 1.

* * * * *